United States Patent [19]
Allen, Jr. et al.

[11] 3,868,353
[45] Feb. 25, 1975

[54] HALF AMIDE-HALF AMMONIUM SLATS OR ALPHA-OLEFIN-MALEIC ANHYDRIDE COPOLYMERS

[76] Inventors: Earle E. Allen, Jr., 4750 South Kenwood, Chicago, Ill. 60615; James A. Smit, 3917 South Washington, Country Club Hills, Ill. 60559; Robert R. Walter, 17695 South Hillcrest Dr., Westmont, Ill. 60477; Roger H. Jansma, 261 Juniper, Park Forest, Ill. 60466

[22] Filed: July 18, 1974

[21] Appl. No.: 489,593

Related U.S. Application Data

[62] Division of Ser. No. 277,643, Aug. 3, 1972.

[52] U.S. Cl.................... 260/78 UA, 117/155 UA
[51] Int. Cl.......................................... C08g 20/00
[58] Field of Search.......... 117/155 UA; 260/78 UA

[56] References Cited
UNITED STATES PATENTS

| | | | |
|---|---|---|---|
| 2,930,775 | 3/1960 | Fordyce | 260/29.6 |
| 3,041,315 | 6/1962 | Gerlich et al. | 260/78 UA |
| 3,157,595 | 11/1964 | Johnson et al. | 260/78 X |
| 3,291,679 | 12/1966 | O'Brien | 260/78 X |
| 3,684,776 | 8/1972 | Field et al. | 260/78 X |
| 3,684,777 | 8/1972 | Field et al. | 260/78 X |

*Primary Examiner*—Michael R. Lusignan
*Attorney, Agent, or Firm*—Johnston, Keil, Thompson & Shurtleff

[57] ABSTRACT

New and useful half amide-half ammonium salts of alpha-olefine-maleic anhydride copolymers are provided in which the alpha-olefine component of said copolymers contains four to six carbon atoms. These compounds are especially useful in sizing cellulosic materials, particularly paper.

5 Claims, No Drawings

3,868,353

HALF AMIDE-HALF AMMONIUM SLATS OR ALPHA-OLEFIN-MALEIC ANHYDRIDE COPOLYMERS

BACKGROUND

Various types of synthetic sizing materials have heretofore been used in sizing paper, for example, photographic papers have heretofore been sized with gelatin combined with a copolymer of styrene and maleic anhydride reacted with ammonia to give a half amide-half ammonium salt, as disclosed in U.S. Pat. No. 2,739,062. The sizing of cellulosic paper especially for use in milk cartons using a styrene-maleic anhydride copolymer and polyvinyl alcohol in which the copolymer can be in the form of the ammonium, amine and alkali metal salts is disclosed in U.S. Pat. No. 3,251,709. Starch modified with half amide-half ammonium salts of styrene-maleic anhydride copolymers has been disclosed as a sizing composition in U.S. Pat. No. 3,368,987. Other types of maleic anhydride copolymer salts have been used in coating cellulosic papers as described in U.S. Pat. No. 3,468,823. Olefine-maleic anhydride copolymers of low molecular weight and derivatives thereof as disclosed in U.S. Pat. No. 2,938,016 and are said to be useful particularly as dispersants in numerous industrial fields and in clay coatings for paper and the like.

Despite the developments heretofore made in the sizing of paper by the use of synthetic copolymers, it would be desirable to provide new and improved sizing and/or coating agents which are highly effective at lower costs.

OBJECTS

One of the objects of the present invention is to provide new and useful synthetic copolymer derivatives which are unique in their ability to act as sizing agents for paper and other cellulose materials.

Another object of the invention is to provide sizing agents which are uniquely different in their ability to impart to paper properties of increased density, or decreased porosity, and increased resistance to ink penetration, thereby improving printaability.

A further object of the invention is to provide compositions which can be stored, shipped and used, either in solid or liquid form, and which are stable under the conditions usually encountered in storage, shipment and use.

An additional object of the invention is to provide compositions which are effective for treating cellulosic materials and which are compatible with starch sizing compositions.

Another object of the invention is to provide compositions which can be used to treat cellulose fibers in order to increase water repellency. Other objects will appear hereinafter.

BRIEF SUMMARY OF THE INVENTION

In accordance with the invention it has been found that a water dispersible half amide-half ammonium salt of an alpha olefine maleic anhydride copolymer in which the alpha olefine component of said copolymer contains 4 to 6 carbon atoms, can be used to size or otherwise treat a paper or other cellulosic material to increase the density or reduce the porosity, to increase water repellency, to increase resistance to solvents and to ink penetration or for other purposes, depending upon the type of material treated.

DETAILED DESCRIPTION OF THE INVENTION

The copolymers of maleic anhydride and alpha olefines can be prepared by solution polymerization in 1,2-dichloropropane using benzoyl peroxide as a catalyst. According to one procedure, equimolar proportions of the alpha olefine and maleic anhydride are used. The alpha olefine is blended with benzoyl peroxide. The maleic anhydride and 1,2-dichloropropane are placed in a reaction vessel and heated with a nitrogen purge to 65°C. The mixture of alpha olefine and benzoyl peroxide is then added dropwise over a 5 to 6 hour period while holding the temperature at 80°–85°C. The product is precipitated in methanol, filtered and dried. The molar ratio of alpha olefine to maleic anhydride can be greater or less than 1:1 but usually a 1:1 ratio is preferred, and it is difficult to achieve greater than a 1:1 polymer. The results obtained in sizing efficiency with increasing olefine content in the charge did not show any significant differences. Mixtures of alpha olefines can be used within the limits of $C_4$–$C_6$ olefine blends but optimum results have been obtained using isobutylene or 1-hexene. The preparation can also be carried out by bulk polymerization without a solvent.

A typical alpha olefine-maleic anhydride copolymer in which the alpha olefine is 1-hexene has the following properties:

TABLE I

| | |
|---|---|
| Melting Poing, °C | 156–164 |
| Equivalent Acid Value[1] | 617 |
| Specific Gravity[2] | 1.246 |
| Inherent Viscosity[3] | 0.145 |
| Molecular Weight | 20,000 |
| Solubility (dil. $NH_4OH$), Wt. % | 30[4] |

[1]Theoretical values, ignoring end group effect
[2]True density
[3]5.0 g/dl in methyl isobutyl ketone at 77°F.
[4]Higher concentrations may be obtained but are difficult to prepare and handle because of high viscosities.

The alpha olefine-maleic anhydride copolymer is converted to the half amide-half ammonium salt by treating the solid copolymer with anhydrous ammonia gas. Aqueous dissolution of the copolymer with ammonium hydroxide yields the di-ammonium salt.

The half amide-half ammonium salt can be used directly as a solid or it can be dissolved in water.

The preferred compounds prepared and used in accordance with the invention have the following recurring structure.

I. 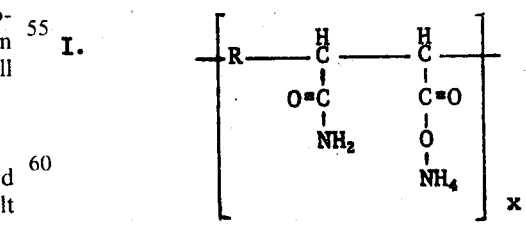

where R is a hydrocarbon group containing 4 to 6 carbon atoms and $x$ is a number greater than 1. Thus, when the olefine is isobutylene R is

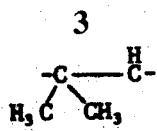

and when the olefine is hexene R is

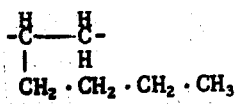

In the foregoing formula x will usually average within the range of 10 to 550 where R contains 4 carbon atoms and within the range of 10 to 145 where R contains 6 carbon atoms.

The half amide-half ammonium salts of the alpha olefine-maleic anhydride copolymers prepared and used in accordance with the invention will have an average molecular weight such that they are water soluble or water dispersible, usually at least 2,000, and more often around 100,000 where R is derived from isobutylene and within the range of 10,000 to 30,000 where R is derived from hexene.

The half amide-half ammonium salt of the alpha olefine-maleic anhydride copolymers made from alpha olefines containing 4 to 6 carbon atoms were found to be uniquely different in the sizing of paper from compounds of the same general type in which the olefine component was ethylene or propylene or a $C_8$ or $C_{12}$ or $C_{16}$ alpha olefine. They were also more efficient as sizing agents than similar compounds in which the alpha olefine was a blend of $C_6$-$C_9$ alpha olefine.

The half amide-half ammonium salts of alpha olefine-maleic anhydride copolymers of the type described herein can be used in treating cellulosic materials for sizing or other purposes in various proportions depending upon the purpose of the treatment. Usually, the amounts employed will be at least 0.5 pounds per 1000 square feet of surface area or at least one pound per ton of cellulosic material. Ordinarily the quantity will be within the range of 1 to 10 pounds of half amide-half ammonium salt of the aforesaid copolymer and a preferred dosage level is 4 pounds per ton.

The half amide-half ammonium salt of the copolymer can be added to paper or other material made from cellulose fibers in order to increase the density or reduce the porosity. It can also be added for the purpose of increasing water repellency and it is especially effective for the purpose of improving printability by increasing the resistance to ink penetration.

Where it is desired to have the coating remain on the surface, the half amide-half ammonium salt of the co-polymer is usually employed in conjunction with a starch of the type customarily used in sizing paper, the amount of starch being within the range of 30 to 230 pound per ton depending upon the grade of paper.

A preferred method of incorporating the half amide-half ammonium salt of the copolymer into paper, with or without starch, is to spray it on the sheet after it has been formed on the paper machine between the first and second press sections of a Fourdrinier machine.

While the invention is especially useful for the preparation of printing papers including newsprint, it can also be used in making glassine paper and what is called board grade paper which is used in making the liner or liners of single faced and double faced corrugated board or in the corrugating medium itself.

When the half amide-half ammonium salt alpha olefine-maleic anhydride copolymers are employed in combination with starch for the purpose of sizing paper made from a cellulose material, they can be added directly to the starch or dissolved in water prior to the addition. The half amide-half ammonium salt alphaolefine-maleic anhydride copolymers of the type described herein have excellent stability when dissolved in water and solutions up to 20–25% solids concentration have acceptable viscosity characteristics. The solid half amide-half ammonium salt alpha olefine-maleic anhydride copolymers of the type described herein remain quite stable at room temperature. These half amide-half ammonium salt derivatives show no effect on the viscosity of starch dispersions at normal dosage levels. At high starch solids and high dosage levels some viscosity changes occur (e.g., 48 seconds to 64 seconds) but these changes are not enough to produce any significant problems.

The invention will be further illustrated but is not limited by the following examples in which the proportions are stated by weight unless otherwise indicated.

EXAMPLE I

A half amide-half ammonium salt of a copolymer having the general structure in formula I where R contains 6 carbon atoms is prepared by reacting anhydrous ammonia gas with a copolymer of 1-hexene and maleic anhydride having the properties given in Table I was used in various evaluation tests.

In order to determine the effectiveness of this composition in sizing a printing paper where starch was also used as one of the sizing components, sheets of a commercial 70 pound base paper made from hard wood and soft wood kraft pulp containing 25% cotton linters were sized on a coating machine (Keegan coater) and dried on a drum dryer (Noble and Wood). Ink penetration was determined on a Hercules ink sizing tester which gives the number of seconds required for the ink to penetrate to a predetermined end point. A pH 2 water based ink was used in the tester. In the ink penetration test the more effective the material, the greater the number of seconds required for penetration.

The starch sizing component was an ethylated corn starch (Penford 280) dispersed in water at 5% solids and used at a temperature of 140°F. at an application rate of 100 pounds per ton of paper. The previously described half amide-half ammonium salt of the copolymer was used at a dosage level of 4 pounds per ton of paper. The half amide-half ammonium salt of the copolymer was added to the starch dispersion first as a solid and again as a 20–25% aqueous solution after the starch had been cooked and before application to the paper. The paper after being sized and tested for ink penetration in the manner previously described gave a test result of 503 seconds.

When the test was repeated using a half amide-half ammonium salt of a copolymer of a 10 carbon atom alpha olefine and maleic anhydride, the ink sizing test result was 7 seconds.

Upon repetition of the test except for the substitution of a half amide-half ammonium salt of a 14 carbon atom alpha olefine-maleic anhydride copolymer, the ink sizing test result was 13 seconds.

When the test was repeated with a di-ammonium salt of a 1-hexene-maleic anhydride copolymer at the same dosage, the ink sizing test result was 325 seconds.

When the test was repeated at the same dosage with a di-ammonium salt of a $C_{10}$ alpha olefine-maleic anhydride copolymer, the ink sizing test result was 39 seconds.

When the test was repeated with the di-ammonium salt of a $C_{14}$ alpha olefine-maleic anhydride copolymer, the ink sizing test result was 13 seconds.

Similar tests made with a half amide-half ammonium salt of an isobutylene-maleic anhydride copolymer having a molecular weight of around 100,000 showed effectiveness in the sizing of paper comparable to that obtained with the half amide-half ammonium salt of the $C_6$ alpha olefine-maleic anhydride copolymer.

Comparable tests with half amide-half ammonium salt copolymers of ethylene or propylene with maleic anhydride indicated that such compounds did not compare in effectiveness with the half amide-half ammonium salts of $C_4$ and $C_6$ alpha olefine-maleic anhydride copolymers.

The foregoing tests demonstrate that the half amide-half ammonium salt alpha olefine-maleic anhydride copolymers where the alpha olefine component contains 4 to 6 carbon atoms are uniquely different in the sizing of paper from half amide-half ammonium salt alpha olefine-maleic anhydride copolymers where the alpha olefine-component contains less than 4 carbon atoms or more than 6 carbon atoms.

EXAMPLE II

The sizing process was carried out by adding the half amide-half ammonium salt of the 1-hexene-maleic anhydride copolymer of Example I as a solid to the starch dispersion with results better than those obtained when said compound was added as an aqueous solution.

EXAMPLE III

The process described in Example I was carried out at various dosages and at pH's within the range of 3 to 10. It was found that a pH range of 5 to 9 provided optimum results.

EXAMPLE IV

The process of Example I was carried out using a half amide-half ammonium salt of 1-hexene-maleic anhydride copolymer having an inherent viscosity of 0.065 and an average molecular weight of about 10,000. The ink test results were very similar to those obtained with the higher molecular weight copolymer half amide-half ammonium salt.

EXAMPLE V

The process of Example I was carried out on a different type paper with effective results.

EXAMPLE VI

The process of Example I was carried out on another type of paper and comparative tests were made using a synthetic styrene-maleic anhydride copolymer. The ink sizing test results with the half amide-half ammonium salt of the 1-hexene-maleic anhydride copolymer of Example I were superior to those obtained with the styrene-maleic anhydride copolymer at the same dosage level.

EXAMPLE VII

Tests were carried out in the sizing of paper using the half amide-half ammonium salt of an isobutylene-maleic anhydride copolymer having a molecular weight of around 100,000 and a half amide-half ammonium salt of a 1-hexene-maleic anhydride copolymer having a molecular weight of around 20,000 in combination with different types of starches and in comparison with a commercial type of synthetic sizing material derived from a styrene-maleic anhydride copolymer on enzyme converted starches, cyanoethylated corn starch, acid modified corn starch, and ethylated corn starch. In every case the copolymers of the present invention were found to give substantially better ink sizing than the commercial sizing material at the same dosage.

EXAMPLE VIII

In a field test where the object was to replace a commercial synthetic sizing material derived from octadecene and maleic anhydried with a composition of the present invention, a control sample of paper sized with a starch at a dosage of 135 pounds per ton and the commercial synthetic sizing material at a dosage of 8 pounds per ton gave a Hercules ink sizing value of 85 seconds. The same paper sized with the same starch at a dosage of 130 pounds per ton and 5.5 pounds per tone of the half amide-half ammonium salt of the 1-hexene-maleic anhydride copolymer of Example I with only 4 parts of the commercial sizing composition gave a Hercules ink sizing value of 240 seconds. When the test was carried out in the same manner but with 2.7 pounds per ton of the composition of Example I the Hercules ink sizing value was 170 seconds. Thus, the amount of the commercial synthetic sizing material was reduced to one-half while the ink resistance was doubled. In these tests a pH 1.5 ink was used.

It has also been found that ink penetration values as high as 2,000 to 3,000 seconds can be obtained by using the half amide-half ammonium salts of $C_4$ and $C_6$ alpha olefin-maleic anhydride copolymers in the sizing of paper without the addition of starch.

The invention is not limited to the sizing of any particular type of paper. It can be applied generally to felted or molded or woven fabrous articles containing cellulose fibers in order to increase the density or reduce the porosity or to increase the resistance to solvents and ink penetration.

The invention is hereby claimed as follows:

1. A water dispersible half amide-half ammonium salt of a copolymer of maleic anhydride and an alpha olefine containing 4 to 6 carbon atoms.

2. A compound as claimed in claim 1 in which said alpha olefine is isobutylene.

3. A compound as claimed in claim 1 in which said alpha olefine is 1-hexene.

4. A copolymer as claimed in claim 2 in which the average molecular weight is within the range of 2,000 to about 100,000.

5. A copolymer as claimed in claim 3 in which the average molecular weight is within the range of 10,000 to 30,000.

* * * * *